United States Patent
Bose et al.

(10) Patent No.: US 7,391,232 B1
(45) Date of Patent: Jun. 24, 2008

(54) METHOD AND APPARATUS FOR EXTENDING LIFETIME RELIABILITY OF DIGITAL LOGIC DEVICES THROUGH REVERSAL OF AGING MECHANISMS

(75) Inventors: Pradip Bose, Yorktown Heights, NY (US); Jeonghee Shin, Los Angeles, CA (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/928,205

(22) Filed: Oct. 30, 2007

(51) Int. Cl.
*H03K 17/16* (2006.01)
*G05F 3/02* (2006.01)

(52) U.S. Cl. .................. 326/33; 326/34; 326/95; 326/98; 327/537; 327/534

(58) Field of Classification Search ............ 326/33, 326/34, 95, 98; 327/537, 534
See application file for complete search history.

(56) References Cited

U.S. PATENT DOCUMENTS

| | | | |
|---|---|---|---|
| 6,307,234 B1 * | 10/2001 | Ito et al. ................ | 257/371 |
| 6,559,708 B2 | 5/2003 | Notani | |
| 7,190,209 B2 | 3/2007 | Kang et al. | |
| 7,215,155 B2 * | 5/2007 | Won ........................ | 326/98 |
| 2006/0076987 A1 * | 4/2006 | Won ........................ | 327/112 |
| 2006/0077002 A1 * | 4/2006 | White ...................... | 327/544 |
| 2006/0172715 A1 * | 8/2006 | Carballo et al. ........ | 455/127.2 |
| 2007/0007997 A1 * | 1/2007 | Kim et al. ............... | 326/34 |
| 2007/0063763 A1 * | 3/2007 | Yoo et al. ................ | 327/544 |
| 2007/0075743 A1 * | 4/2007 | Oh .......................... | 326/83 |

* cited by examiner

*Primary Examiner*—Vibol Tan
(74) *Attorney, Agent, or Firm*—Cantor Colburn LLP; Lisa Yamonaco (57) ABSTRACT

An apparatus for extending lifetime reliability of CMOS circuitry includes a logic high supply rail, a logic low supply rail, and a virtual supply rail. In an intense recovery mode of operation, a first switching device is rendered nonconductive so as to isolate the virtual supply rail from the one of the logic high supply rail and the logic low supply rail, and the second switching device is rendered conductive so as to equalize the voltage on the virtual supply rail and the other of the logic high supply rail and the logic low supply rail. At least one device within the circuitry provides one of the logic high voltage and the logic low voltage to a gate terminal of an FET within the circuitry, with a source terminal of the FET coupled to the virtual supply rail, such that the FET is subjected to a reverse bias condition.

5 Claims, 7 Drawing Sheets

|       | $IR_{even}$ | $IR_{odd}$ | PG       | NO       |
|-------|-------------|------------|----------|----------|
| 506b  | $V_{dd}$    | 0V         | $V_{dd}$ | 0V       |
| 510b  | $V_{dd}$    | 0V         | 0V       | 0V       |
| 610b  | $V_{dd}$    | 0V         | $V_{dd}$ | $V_{dd}$ |
| 606b  | $V_{dd}$    | 0V         | 0V       | $V_{dd}$ |
| 506a  | 0V          | $V_{dd}$   | $V_{dd}$ | 0V       |
| 510a  | 0V          | $V_{dd}$   | 0V       | 0V       |
| 610a  | 0V          | $V_{dd}$   | $V_{dd}$ | $V_{dd}$ |
| 606a  | 0V          | $V_{dd}$   | 0V       | $V_{dd}$ |

METHOD AND APPARATUS FOR EXTENDING LIFETIME RELIABILITY OF DIGITAL LOGIC DEVICES THROUGH REVERSAL OF AGING MECHANISMS

BACKGROUND

The present invention relates generally to improvements in lifetime reliability of semiconductor devices and, more particularly, to a method and apparatus for extending lifetime reliability of digital logic devices through selective reversal of aging mechanisms.

Lifetime reliability has become one of the major concerns in microprocessor architectures implemented with deep submicron technologies. In particular, extreme scaling resulting in atomic-range dimensions, inter and intra-device variability, and escalating power densities have all contributed to this concern. At the device and circuit levels, many reliability models have been proposed and empirically validated by academia and industry. As such, the basic mechanisms of failures at a low level have been fairly well understood, and thus the models at that level have gained widespread acceptance. In particular, work lifetime reliability models for use with single-core architecture-level, cycle-accurate simulators have been introduced. Such models have focused on certain major failure mechanisms including, for example, electromigration (EM), negative bias temperature instability (NBTI), PBTI (positive bias temperature instability) and time dependent dielectric breakdown (TDDB).

With respect to improving lifetime reliability of semiconductor devices, existing efforts may be grouped into three general categories: sparing techniques, graceful degradation techniques, and voltage/frequency scaling techniques. In sparing techniques, spare resources are designed for one or more primary resources and deactivated at system deployment. When primary resources fail later during system lifetime, the spare resources are then activated and replace the failed resources in order to extend system lifetime. The sparing techniques cause less performance degradation due to failed resources. However, high area overhead of spare resources is a primary drawback of this approach.

In graceful degradation techniques, spare resources are not essential in order to extend system lifetime. Instead, when resource failing occurs, systems are reconfigured in such a way so as to isolate the failed resources from the systems and continue to be functional. As a result, graceful degradation techniques save overhead cost for spare resources, however system performance degrades throughout lifetime. Accordingly, graceful degradation techniques are limited to applications and business where the degradation of performance over time is acceptable, which unfortunately excludes most of the high-end computing.

Thirdly, voltage/frequency scaling techniques are often used for power and temperature reduction and are thus proposed for lifetime extension. The system lifetime is predicted based on applied workloads and the voltage/frequency of the systems is scaled with respect to lifetime prediction. While voltage/frequency scaling techniques enable aging of systems to be slowed down as needed, these techniques also result in performance degradation of the significant parts of the system or the entire systems. In addition, although reduced voltage/frequency diminishes the degree of stress conditions, these techniques are unable to actually remove stress conditions of aging mechanisms from semiconductor devices.

Still another existing technique, directed to reducing the leakage power during inactive intervals, is to use so-called "sleep" or "power down" modes in which, for logic devices configured from low-threshold transistors, high-threshold transistors serve as a footer or a header to cut leakage during the quiescence intervals. During a normal operation mode, the circuits achieve high performance, resulting from the use of low-threshold transistors. The headers and/or footers are activated so as to couple the circuits to $V_{dd}$ and/or ground (more generally logic high and low voltage supply rails). In contrast, during the sleep mode, the high threshold footer or header transistors are deactivated to cut off leakage paths, thereby reducing the leakage currents by orders of magnitude. This technique, also known as "power gating," has been successfully used in embedded devices, such as systems on a chip (SOC). However, although power gating diminishes current flow and electric field across semiconductor devices (which results in a certain degree of stress reduction and increase in the lifetime of devices), it is unable to completely eliminate such stress conditions and/or stimulate the recovery effects of aging mechanisms.

SUMMARY

The foregoing discussed drawbacks and deficiencies of the prior art are overcome or alleviated, in an exemplary embodiment, by an apparatus for selectively extending lifetime reliability of digital logic devices, including complementary metal oxide semiconductor (CMOS) circuitry configured between a logic high supply rail and a logic low supply rail; a first switching device coupled between one of the logic high supply rail and the logic low supply rail and a first virtual supply rail coupled to the CMOS circuitry, and a second switching device coupled between the first virtual supply rail and the other of the logic high supply rail and the logic low supply rail; wherein, in a normal mode of operation, the first switching device is rendered conductive and the second switching device is rendered nonconductive so as to supply the full voltage value between the logic high supply rail and the logic low supply rail to the CMOS circuitry, and wherein, in an intense recovery mode of operation, the first switching device is rendered nonconductive so as to isolate the first virtual supply rail from the one of the logic high supply rail the logic low supply rail, and the second switching device is rendered conductive so as to equalize the voltage on the virtual supply rail and the other of the logic high supply rail and the logic low supply rail; and at least one device within the CMOS circuitry configured, in the intense recovery mode of operation, to provide one of the logic high voltage and the logic low voltage to a gate terminal of a first field effect transistor (FET) within the CMOS circuitry, with a source terminal of the first FET coupled to the virtual supply rail, such that the FET is subjected to a full rail reverse bias condition.

BRIEF DESCRIPTION OF THE DRAWINGS

Referring to the exemplary drawings wherein like elements are numbered alike in the several Figures.

DETAILED DESCRIPTION

Disclosed herein is a robust lifetime extension method and apparatus that enables the aging of resources to be reversed by entering a special mode, referred to herein as an "intense recovery" mode. As described in more detail below, intense recovery is implemented in such a way as to reverse stress conditions of aging mechanisms, such as electromigration, negative bias temperature instability (NBTI), PBTI (positive bias temperature instability), and time dependent dielectric breakdown (TDDB), from semiconductor devices composing the resources.

In the case of electromigration, stress conditions result from current flow generated during one of a logical one-to-zero and a logical zero-to-one value transition of metal lines. For NBTI, semiconductor devices (more specifically PFET devices) are under stress when the gate terminal is coupled to a logic low voltage and the corresponding source terminal is coupled to a logic high voltage. For PBTI, semiconductor devices (more specifically NPFET devices) are under stress when the gate terminal is coupled to a logic high voltage and the corresponding source terminal is coupled to a logic low voltage. Similarly, for the TDDB aging mechanism, stress conditions result from having a gate coupled to a logic low voltage and a source coupled to a logic high voltage for PFET devices, and having a gate coupled to a logic high voltage and a source coupled to a logic low voltage for NFET devices.

Such stress conditions may be reversed by reverse biasing the FET devices (i.e., applying a positive $V_{gs}$ voltage to a PFET device and a negative $V_{gs}$ voltage to an NFET device). While $V_{dd}$ or GND isolation/disconnection has also been used in conventional power gating, such power gating circuitry is not effective in completely eliminating stress conditions, as its focus is leakage power reduction. For example, NBTI recovery effects have been reported to be accelerated by reversing the bias of PFET devices due to aggressive attraction of runaway hydrogen atoms to the $Si/SiO_2$ interface. That is, the recovery process of threshold voltage increase due to NBTI is more efficient if PFET devices, for example, are positively biased (i.e., $V_{gs}=V_{dd}$) rather than have no bias (i.e., $V_{gs}=0$). For PBTI, the full recovery of the NFET threshold under reverse bias has been reported.

Figures 1, 2:
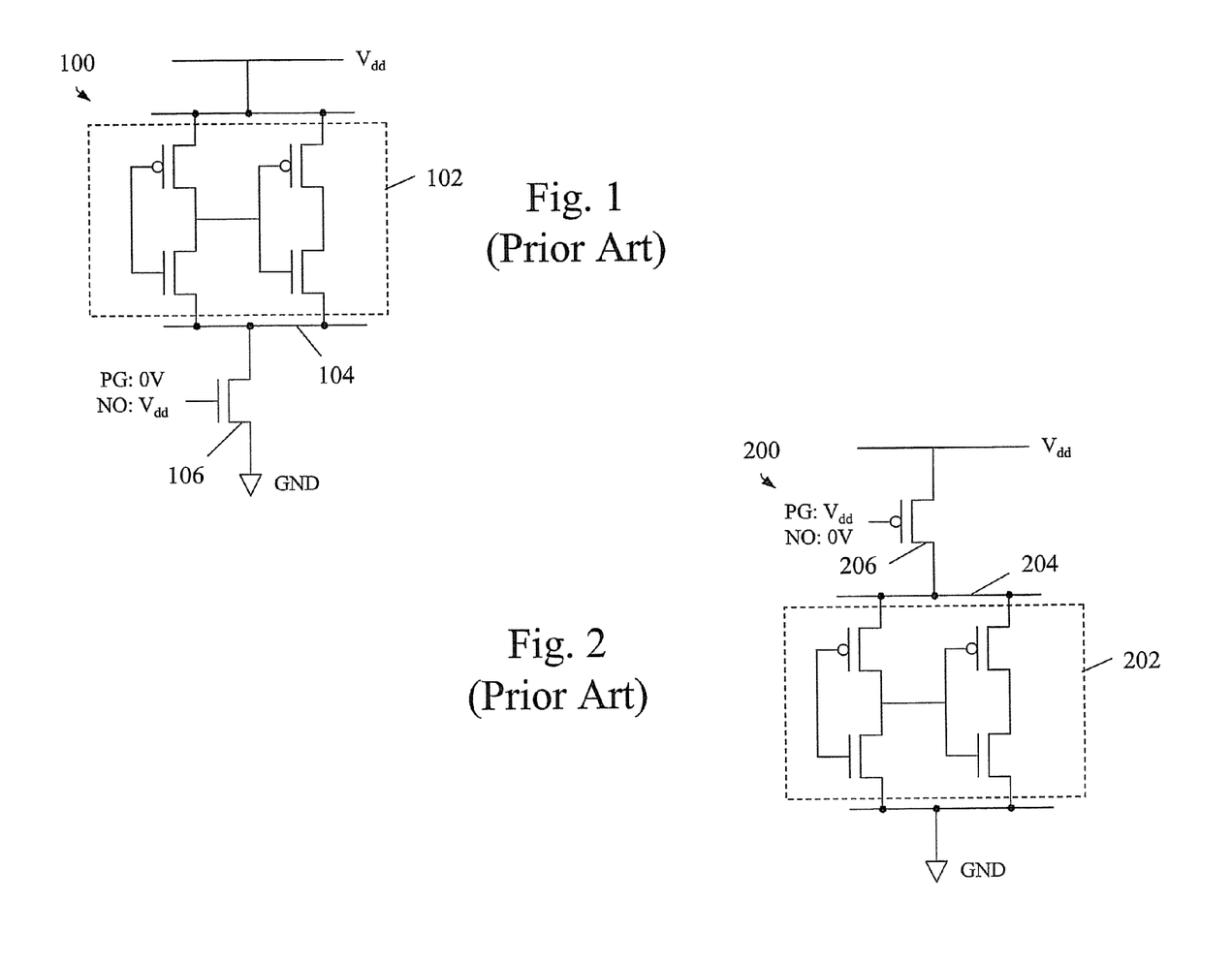
FIG. 1 is a schematic diagram of a footer version of a conventional power gating apparatus that is used in conjunction with CMOS circuitry.
FIG. 2 is a schematic diagram of a header version of a conventional power gating apparatus that is used in conjunction with CMOS circuitry.

Referring initially to FIG. 1, there is shown a schematic diagram of a conventional power gating apparatus 100 that is used in conjunction with CMOS circuitry 102. The circuitry 102, for ease of description, depicts a simple CMOS inverter pair. However, it will be understood that circuitry 102 can represent more complex devices, such as SRAM arrays, EDRAM arrays, register files, execution units, processor cores, processor chips and systems, and the like. In this example of power gating, the circuitry 102 is selectively connected between a virtual ground node 104 and ground through a footer (NFET) device 106.

In a normal operation (NO) mode, the virtual ground node 104 is at ground potential by activating the gate terminal of the NFET footer 106. Thus, the full value of the rail voltage is used by the circuitry 102. However, in the power gating (PG) mode, the virtual ground node 104 is isolated from ground by deactivating the gate of the NFET footer 106. Immediately after entering the power gating mode, the virtual ground is at the same potential as GND, and the circuit 102 still sees the full power swing between $V_{dd}$ and the virtual ground. As a result, the leakage current through the circuit 102 in the initial moments of power gating interval is the same as immediately before entering the power gating mode. The leakage through the footer device 106 in the initial moment of power gating interval is zero, because there is zero voltage between its source and drain. As a result, the difference between the leakage currents though the circuit 102 and the footer device 106 charges the virtual ground up, which leads to an increase in the leakage through the footer device, and reduction of the leakage through the logic. As the voltage at the virtual ground increases, the leakage though the logic is reduced, whereas the leakage through the footer device increases. When the leakage though the footer device becomes equal to the leakage though the logic, the voltage at the virtual ground reaches the steady state value. Eventually, this leakage stops and the voltage of the virtual ground node 104 stabilizes at some value between ground and $V_{dd}$ (e.g., from about ⅓ $V_{dd}$ to about ⅔ $V_{dd}$). As a result, the power gating circuitry reduces leakage power during this mode.

FIG. 2 is a schematic diagram of another conventional power gating apparatus 200 that is used in conjunction with CMOS circuitry 202. Again, the circuitry 202, for ease of description, depicts a simple CMOS inverter pair. However, it will be understood that circuitry 202 can represent more complex devices, such as SRAM arrays, EDRAM arrays, register files, execution units, processor cores, processor chips and systems, and the like. In this example of power gating, the circuitry 202 is selectively connected between a virtual $V_{dd}$ node 304 and $V_{dd}$ through a header (PFET) device 206.

In a normal operation (NO) mode, the virtual $V_{dd}$ node 204 is at $V_{dd}$ potential by activating the gate terminal of the PFET header 206. Thus, the full value of the rail voltage is used by the circuitry 202. However, in the power gating (PG) mode, the virtual $V_{dd}$ node 204 is isolated from $V_{dd}$ by deactivating the gate of the PFET header 206. Immediately after entering the power gating mode, the virtual $V_{dd}$ is at the same potential as $V_{dd}$, and the circuitry 202 still sees the full power swing between ground and the virtual $V_{dd}$. As a result, the leakage current through the circuitry 202 in the initial moments of power gating interval is the same as immediately before entering the power gating mode. The leakage through the header device 206 in the initial moment of power gating interval is zero, because there is zero voltage between its source and drain. As a result, the difference between the leakage currents though the circuitry 202 and the header device 206 discharges the virtual $V_{dd}$, which leads to an increase in the leakage through the header device, and reduction of the leakage through the logic. As the voltage at the virtual $V_{dd}$ decreases, the leakage though the logic is reduced, whereas the leakage through the header device increases. When the leakage though the header device becomes equal to the leakage though the logic, the voltage at the virtual $V_{dd}$ reaches the steady state value. Eventually, this leakage stops and the voltage of the virtual $V_{dd}$ node 204 stabilizes at some value between ground and $V_{dd}$ (e.g., from about ⅓ $V_{dd}$ to about ⅔ $V_{dd}$). As a result, the power gating circuitry reduces leakage power during this mode.

To a certain degree, the power gating apparatus 100 of FIG. 1 and apparatus 200 of FIG. 2 lessen the stress conditions of wearout failure mechanisms. For example, current flow through metal lines and electric field across devices causing failure mechanisms such as NBTI and TDDB are significantly reduced in the power gating mode. On the other hand, the power gating apparatus embodiments 100, 200 cannot reverse the bias of the FET devices or, for that matter even completely remove the electric field across FET devices (i.e., force $V_{gs}$=0) due to the voltage difference between the virtual node and the associated power rail. This in turn prevents implementation of any relief/recovery mechanisms with respect to stress conditions, such as NBTI or PBTI for example.

Figure 3A:
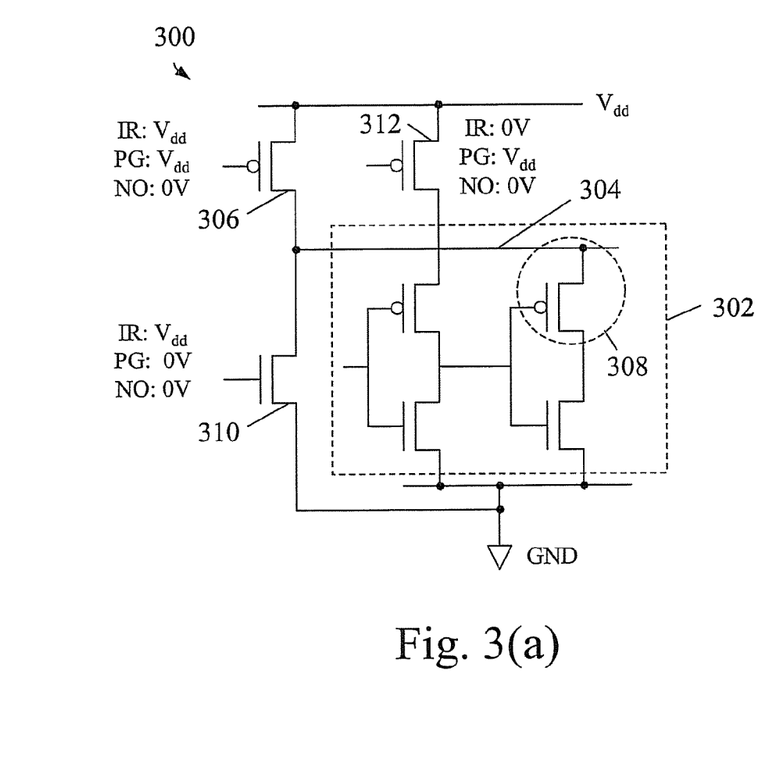
FIGS. 3(a) and 3(b) are schematic diagrams of an apparatus for reversing aging of circuit devices by implementing an intense recovery mode, in accordance with an exemplary embodiment of the invention.

Accordingly, FIG. 3(a) is a schematic diagram of an apparatus 300 for reversing aging of circuit devices by implementing an intense recovery mode, in accordance with an exemplary embodiment of the invention. In addition to providing current leakage (power gating) control for circuitry 302 through a header device 306 coupled to a virtual $V_{dd}$ node 304, the apparatus 300 is also configured to selectively reverse bias PFET devices in the circuitry 302, such as PFET 308, by discharging the virtual $V_{dd}$ node 304, while also maintaining a logic high gate voltage on the reverse biased PFET (e.g., PFET 308). It should be understood that circuitry 302 can also represent more complex devices, such as SRAM arrays, EDRAM arrays, register files, execution units, processor cores, processor chips and systems, and the like.

Thus, as further shown in FIG. 3(a), the apparatus 300 additionally includes an NFET device 310 that, when activated, pulls down the virtual $V_{dd}$ node 304 to ground. The source of the NFET device 310 is coupled to ground while the drain of the NFET device 310 is coupled to the drain of the PFET header 306. In addition, because a full logic high gate value is used for the reverse biasing of PFET 308, at least one of the other circuit devices within circuitry 302 is selectively coupled to the $V_{dd}$ power rail instead of to the virtual $V_{dd}$ power rail 304 that is discharged during the intense recovery mode. This selective coupling to the $V_{dd}$ power rail is implemented through a PFET 312. However, in the event that the circuitry does not need to support the power gating mode, then PFET 312 may be omitted.

In a normal mode of circuit operation (NO), the header PFET 306 is conductive or activated, while the pull down NFET 310 is nonconductive, or deactivated. That is, the gate terminals of the both the header PFET 306 and the NFET 310 are at logic low (e.g., ground). In addition, PFET 312 is conductive so that all of the rail connected PFETs residing in circuitry 302 have access to the full magnitude of the $V_{dd}$ voltage. For the power gating (PG) mode for maximum current leakage protection as described above, both the header PFET 306 and the NFET 310 are nonconductive. That is, the gate terminal of the header PFET 306 is at logic high (e.g., $V_{dd}$) and the gate terminal of the NFET 310 is at logic low. In this case, PFET 312 is nonconductive to prevent leakage through the circuitry 302 to the $V_{dd}$ rail.

Figure 3B:
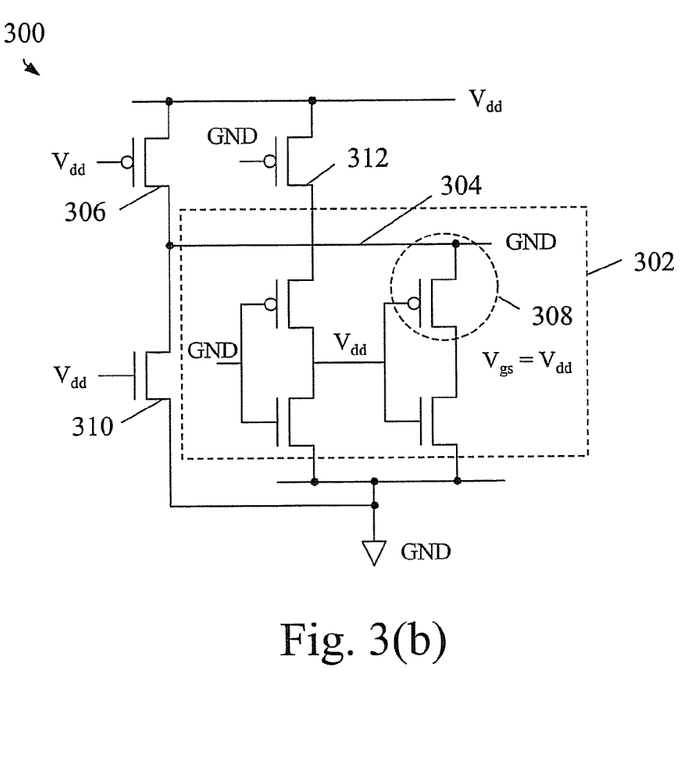

However, in the intense recovery (IR) mode, the header PFET 306 is deactivated (set to be nonconductive) while the NFET 310 is activated. That is, the gate terminals of both the header PFET 306 and the NFET 310 are at logic high. As a result, the virtual $V_{dd}$ node 304 is discharged to ground through the NFET 310, as it is isolated from $V_{dd}$. In turn, because the source terminal of PFET 308 (coupled to the virtual $V_{dd}$ node 304) is now at ground potential, the PFET 308 will be reversed biased so long as a logic high ($V_{dd}$) voltage is applied to the gate terminal thereof. By activating PFET 312, a $V_{dd}$ voltage is available to at least part of the circuitry 302, and it is therefore possible to generate this (full magnitude) $V_{dd}$ voltage at the gate of PFET 308. In the simple example depicted, the input of the first inverter in the circuitry 302 can be set to logic low, thereby producing a logic high voltage at the gate of PFET 308. The specific FET gate voltage values for the apparatus 300 in the IR mode are depicted in FIG. 3(b). Thus, because PFET 308 has a positive $V_{gs}$ voltage applied thereto, the electric field or stress conditions of wearout failure mechanisms across the circuit devices are reversed.

It will further be appreciated that the reverse bias principles of intense recovery are also applicable to NFET devices as well, in addition to the PFET example of FIGS. 3(a) and 3(b). Stated another way, the stress condition may be reversed for NFET devices by applying a negative $V_{gs}$ voltage thereto and by pulling the source of the NFET to the $V_{dd}$ voltage.

Figure 4A:
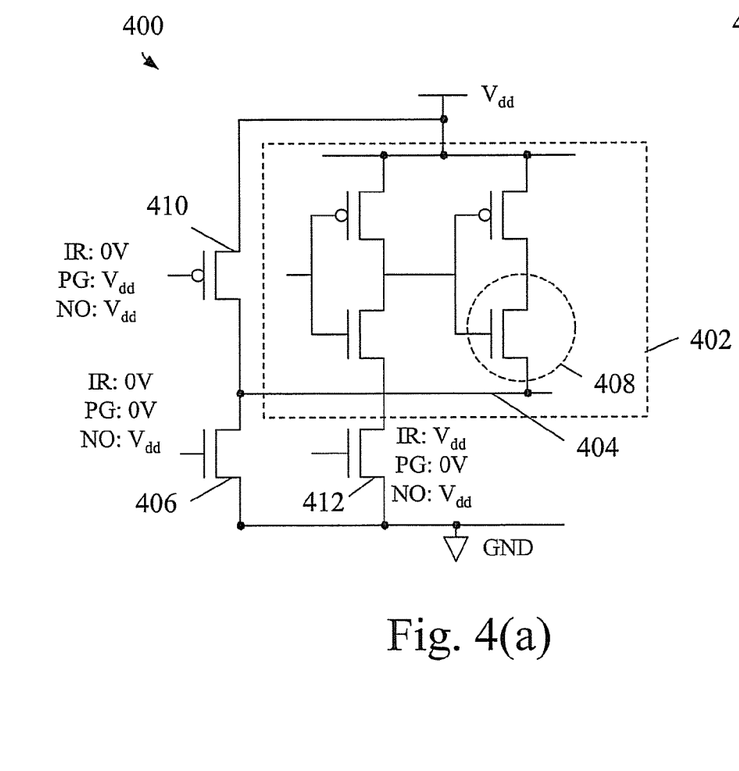
FIGS. 4(a) and 4(b) are schematic diagrams of an apparatus for reversing aging of circuit devices by implementing an intense recovery mode, in accordance with another exemplary embodiment of the invention.

Referring now to FIG. 4(a), there is shown a schematic diagram of an apparatus 400 for reversing aging of circuit devices by implementing an intense recovery mode, in accordance with an exemplary embodiment of the invention. In addition to providing current leakage (power gating) control for circuitry 402 through an NFET footer device 406 coupled to a virtual ground node 404, the apparatus 400 is also configured to selectively reverse bias NFET devices in the circuitry 402, such as NFET 408, by charging the virtual ground node 404 to $V_{dd}$, while also maintaining a logic low gate voltage on the reverse biased NFET (e.g., NFET 408).

Thus, as further shown in FIG. 4(a), the apparatus 400 additionally includes a PFET device 410 that, when activated, pulls up the virtual ground node 404 to $V_{dd}$. The source of the PFET device 410 is coupled to $V_{dd}$ while the drain of the PFET device 410 is coupled to the drain of the NFET footer 406. In addition, because a full logic low gate value is used for the reverse biasing of NFET 408, at least one of the other circuit devices within circuitry 402 is selectively coupled to the ground rail instead of to the virtual ground power rail 404 that is charged during the intense recovery mode. This selective coupling to the ground power rail is implemented through an NFET 412.

In a normal mode of circuit operation (NO), the footer NFET 406 is conductive or activated, while the pull up PFET 410 is nonconductive, or deactivated. That is, the gate terminals of the both the footer NFET 406 and the PFET 410 are at logic high (e.g., $V_{dd}$). In addition, NFET 412 is conductive so that all of the rail connected NFETs residing in circuitry 402 have access to the actual ground potential. For the power gating (PG) mode for maximum current leakage protection as described above, both the footer NFET 406 and the PFET 410 are nonconductive. That is, the gate terminal of the footer NFET 406 is at logic low (e.g., 0 volts) and the gate terminal of the PFET 410 is at logic high. In this case, NFET 312 is nonconductive to prevent leakage through the circuitry 402 to the ground rail.

Figure 4B:
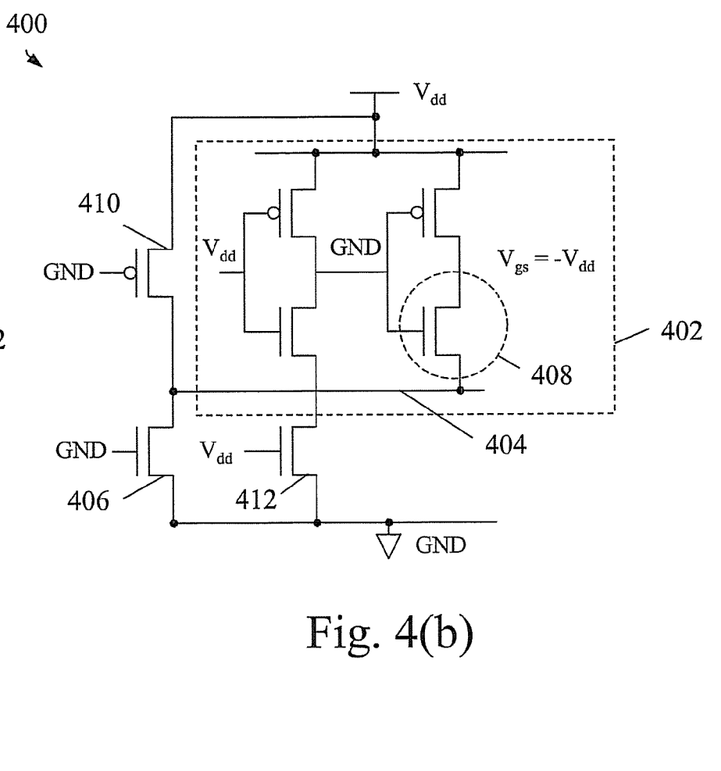

However, in the intense recovery (IR) mode, the footer NFET 406 is deactivated while the PFET 410 is activated. That is, the gate terminals of both the footer NFET 406 and the PFET 410 are at logic low. As a result, the virtual ground node 404 is charged to $V_{dd}$ through the PFET 410, as it is isolated from ground. In turn, because the source terminal of NFET 408 (coupled to the virtual ground node 404) is now at $V_{dd}$ potential, the NFET 408 will be reversed biased so long as a logic low (GND) voltage is applied to the gate terminal thereof. By activating NFET 412, a ground voltage is available to at least part of the circuitry 402, and it is therefore possible to generate this ground voltage at the gate of NFET 408. In the simple example depicted, the input of the first inverter in the circuitry 402 can be set to logic high, thereby producing a logic low voltage at the gate of NFET 408. The specific FET gate voltage values for the apparatus 400 in the IR mode are depicted in FIG. 4(b). Thus, because NFET 308 has a negative $V_{gs}$ voltage applied thereto, the electric field or stress conditions of wearout failure mechanisms across the circuit devices are reversed.

Figure 5:
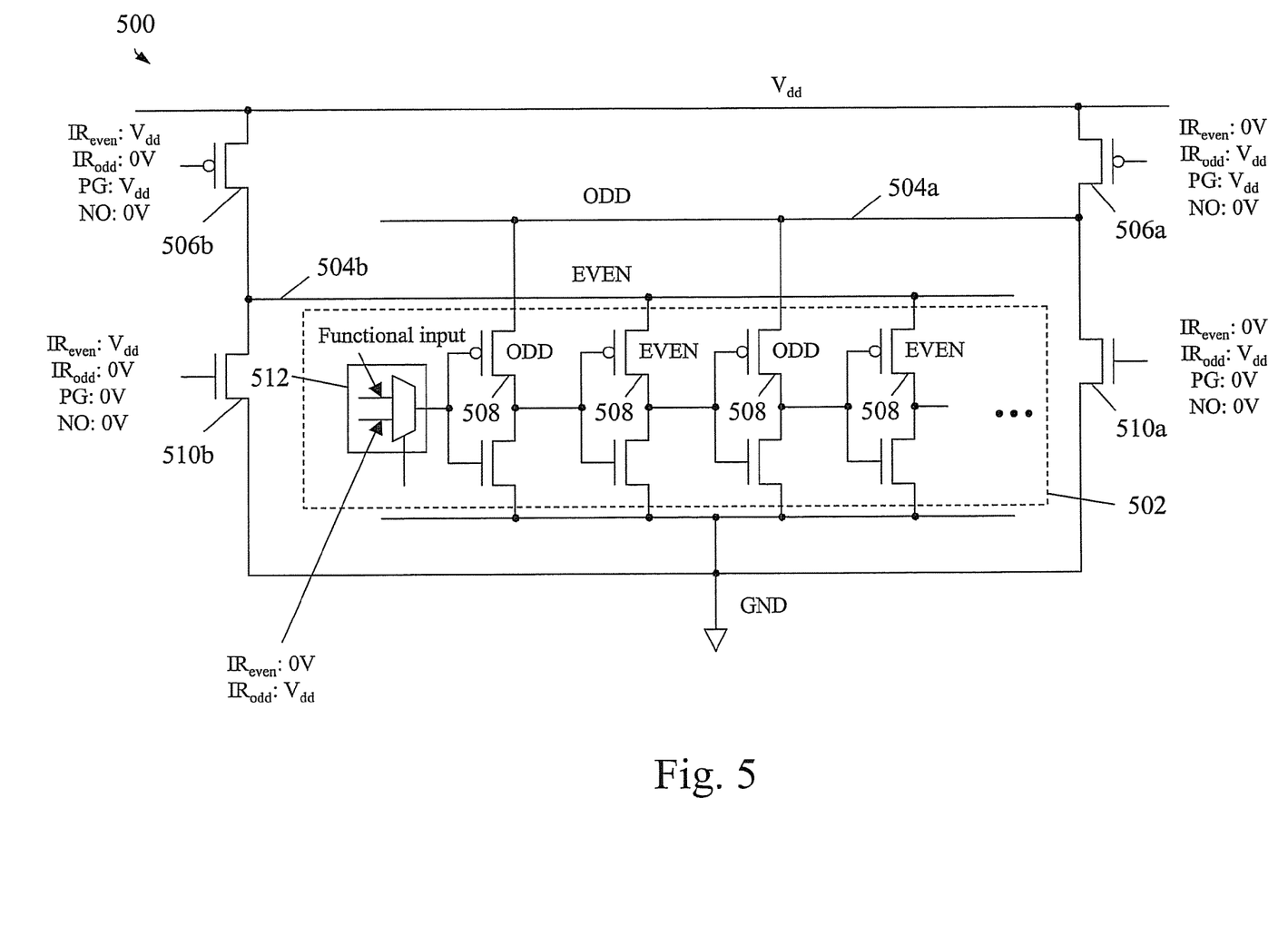
FIG. 5 is a schematic diagram of an apparatus for reversing aging of circuit devices by implementing an intense recovery mode, in accordance with another exemplary embodiment of the invention.

Although the intense recovery technique extends lifetime reliability, it utilizes additional device overhead (e.g., three additional transistors for one PFET device). Thus, the IR mode may be supported for selective devices. For example, FIG. 5 is a schematic diagram of an apparatus 500 for reversing aging of circuit devices by implementing an intense recovery mode, in accordance with another exemplary embodiment of the invention. In this exemplary embodiment, the apparatus 500 is configured to implement intense recovery for PFETs 508 in alternating stages of the CMOS circuitry 502, designated by "ODD" and "EVEN."

More specifically, the apparatus 500 includes a first virtual $V_{dd}$ rail 504a associated with a first header PFET 506a, and a second virtual $V_{dd}$ rail 504b associated with a second header PFET 506b. In the intense recovery mode, the first virtual $V_{dd}$ rail 504a is discharged to ground through a first NFET 510a so as to implement intense recovery for the PFETs 508 in the ODD stages of circuitry 502. The second virtual $V_{dd}$ rail 504b remains charged to $V_{dd}$ so as to allow the circuit devices in the EVEN stages to supply a proper $V_{dd}$ input to the gate terminals of the rest of the PFETs 508 in the ODD stages. Conversely, the second virtual $V_{dd}$ rail 504b is discharged to ground through a second NFET 510b so as to implement intense recovery for the PFETs 508 in the EVEN stages of circuitry 502. The first virtual $V_{dd}$ rail 504a remains charged to $V_{dd}$ so as to allow the circuit devices in the ODD stages to supply a proper $V_{dd}$ input to the gate terminals of the rest of the PFETs 508 in the EVEN stages.

As further shown in FIG. 5, a control block 512 (e.g., multiplexer) is used to selectively switch between a functional input signal in a normal mode of operation and an intense recovery input signal during the IR mode. The value of the IR signal depends on whether the PFETS 508 in the ODD or the EVEN stages of circuitry 502 are being refreshed. To refresh the ODD PFETs, the IR signal is set to $V_{dd}$, and to refresh the EVEN PFETs, the IR signal is set to ground.

Figure 6:
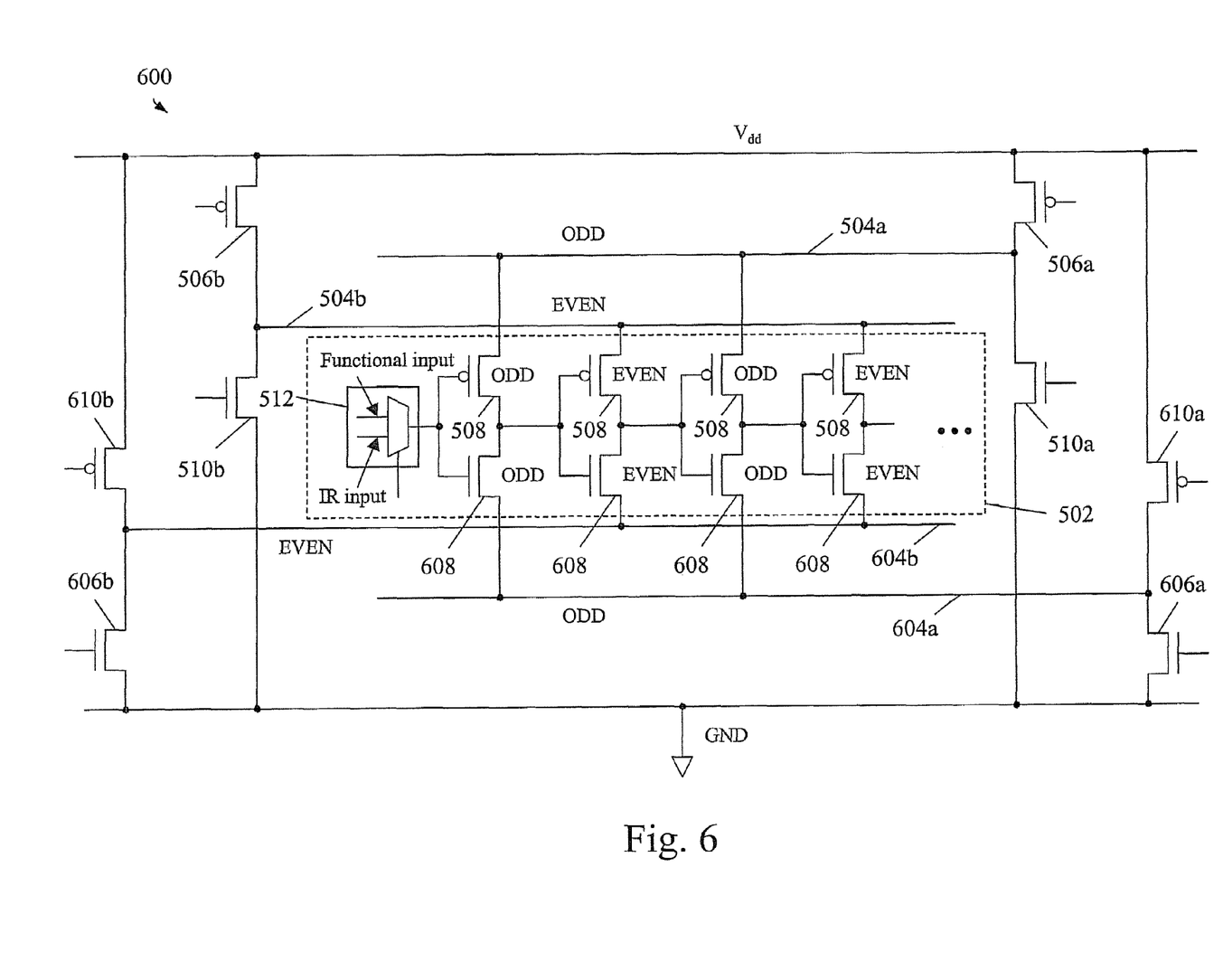
FIG. 6 is a schematic diagram of an apparatus for reversing aging of circuit devices by implementing an intense recovery mode, in accordance with still another exemplary embodiment of the invention.

As will also be appreciated, the apparatus 500 of FIG. 5 can be further modified such that during intense recovery of PFETs 508 in ODD stages of circuitry 502 (where $V_{dd}$ is applied at the gate terminals thereof), it is also possible to simultaneously perform intense recovery of NFETs in the EVEN stages of circuitry 502, since the gate voltages thereto are at ground potential. Accordingly, FIG. 6 is a schematic diagram of an apparatus 600 for reversing aging of circuit devices by implementing an intense recovery mode, in accordance with still another exemplary embodiment of the invention. In addition to the elements provided in the embodiment of FIG. 5, the apparatus 600 further includes a first virtual ground rail 604a associated with a first footer NFET 606a, and a second virtual ground rail 604b associated with a second footer NFET 606b.

In the intense recovery mode, the first virtual ground rail 604a is charged to $V_{dd}$ through a first PFET 610a so as to implement intense recovery for the NFETs 608 in the ODD stages of circuitry 502. The second virtual ground rail 604b remains at ground potential so as to allow the circuit devices in the EVEN stages to supply a proper ground input to the gate terminals of the rest of the NFETs 608 in the ODD stages. Conversely, the second virtual ground rail 604b is charged to $V_{dd}$ through a second PFET 610b so as to implement intense recovery for the NFETs 608 in the EVEN stages of circuitry 502. The first virtual ground rail 604a remains at ground potential so as to allow the circuit devices in the ODD stages to supply a proper ground input to the gate terminals of the rest of the NFETs 608 in the EVEN stages.

Figure 7:
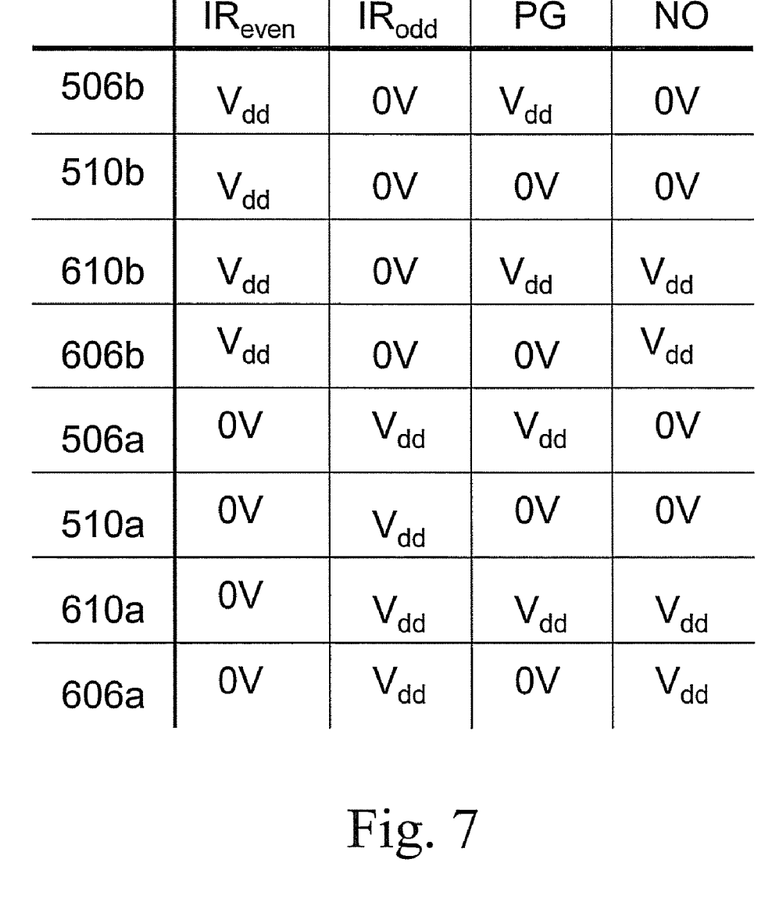
FIG. 7 is a truth table illustrating the input values for the various transistor of the embodiment of FIG. 6 for various modes of operation, including intense recovery.

It will thus be seen that, through the embodiment 600 of FIG. 6 and the truth table shown in FIG. 7, an intense recovery operation of PFETs 508 in the ODD stages of circuitry 502 results in the simultaneous intense recovery of NFETs 608 in the EVEN stages of circuitry 502. On the other hand, an intense recovery operation of PFETs 508 in the EVEN stages of circuitry 502 results in the simultaneous intense recovery of NFETs 608 in the ODD stages of circuitry 502. The transistor input values for the normal and power gating modes of operation are also illustrated in FIG. 7.

Those skilled in the art may combine the circuit embodiments of FIGS. 5 and 6, or those of FIGS. 3 and 4 to allow the recovery of both NFETs and PFETs in technologies that are subject to both NBTI and PBTI. Furthermore, although though the footer and header devices in FIGS. 3 through 3 are shown as a single device, it should be noted that they could also be implemented through multiple devices, connected in parallel. In an exemplary layout, such footer and header devices may be mixed with the devices of the circuitry in a row-by row basis, a column-by-column basis or any other order, or by being located in a perimeter fashion around the main circuitry. Furthermore, the header and footer devices may also be implemented as multiple devices of different strengths (conductivity), with individual control of the each device gates so as to select a specific level of strength of the header/footer device. Moreover, this technique would also be applicable to pull up/pull down devices used to charge/discharge the virtual rail in the IR mode.

Figure 8:
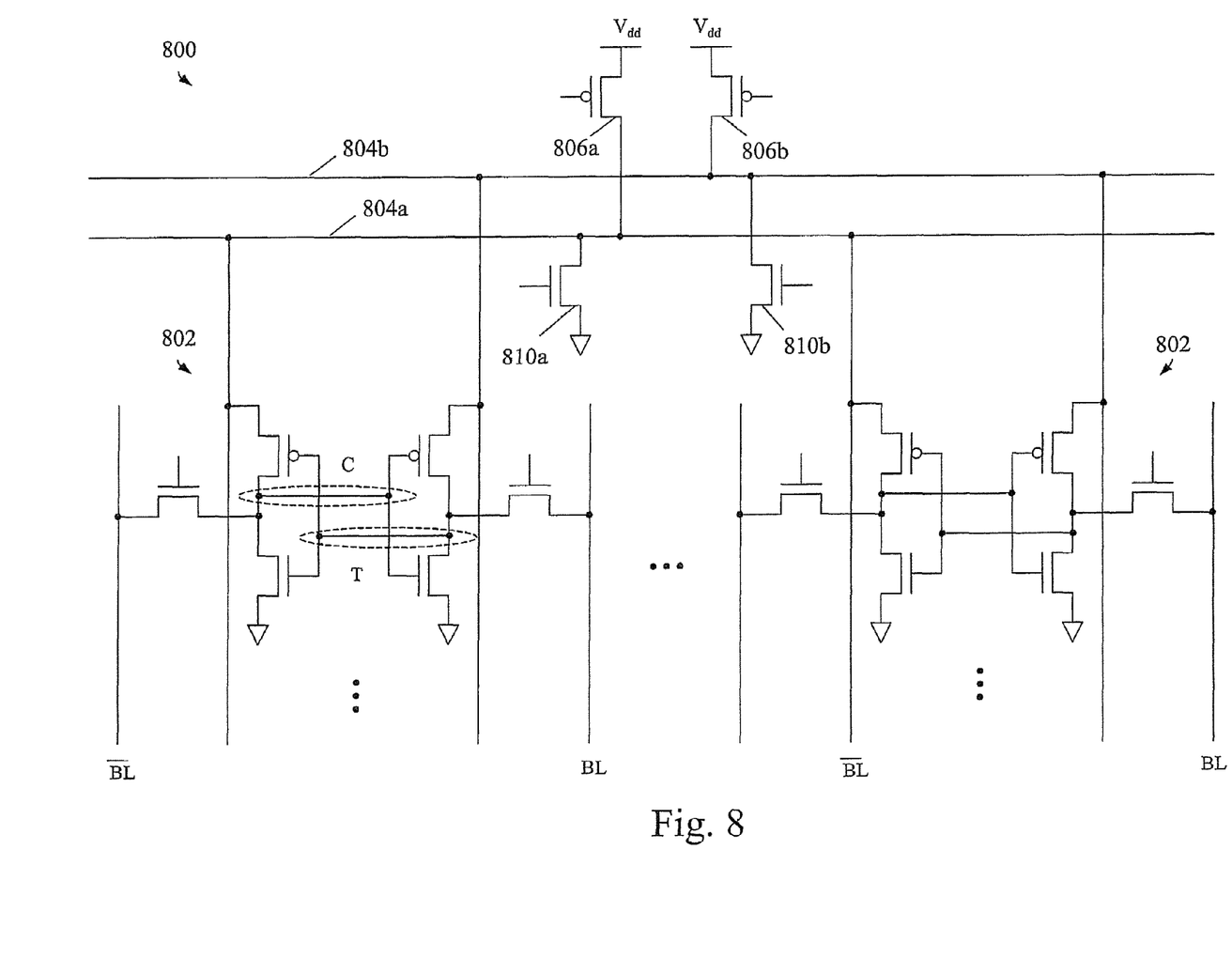
FIG. 8 is a schematic diagram of an apparatus for reversing aging of a static random access memory (SRAM) array by implementing an intense recovery mode, in accordance with still another exemplary embodiment of the invention.

As indicated earlier, the circuitry (e.g., 302, 502, etc.) may represent more complex devices, such as cross-coupled inverters found in SRAM arrays. FIG. 8 is a schematic diagram of an apparatus 800 for reversing aging of a static random access memory (SRAM) array by implementing an intense recovery mode, in accordance with still another exemplary embodiment of the invention. In the exemplary embodiment depicted, the SRAM array is made up of individual SRAM cells 802 arranged into rows and columns. As the operation of a six-transistor (6T) SRAM cell (a pair of cross-coupled inverters and a pair of access transistors) is well known in the art, a detailed description of the same is omitted herein.

Similar to the more general embodiment of FIG. 5, the apparatus 800 is configured to implement intense recovery for the PFET of the SRAM cells 802. However, whereas apparatus 500 implements intense recovery for PFETs in alternating "ODD" and "EVEN" stages of the CMOS circuitry 502, apparatus 800 implements intense recovery for the right and left PFETs of each cell 802 (i.e., the PFETs associated with either the true or complement nodes of the SRAM cell 802).

More specifically, the apparatus 800 includes a first virtual $V_{dd}$ rail 804a associated with a first header PFET 806a, and a second virtual $V_{dd}$ rail 804b associated with a second header PFET 806b. In the intense recovery mode for the left side PFETs (i.e., those PFETs with drain terminals coupled to the complement data node C), the cell 802 is first written to a logical "1" (i.e., the true node, T, is at logic high) such that the gate voltage of the left side PFETs are at $V_{dd}$. Because the gate voltage of the left side NFETs are also at $V_{dd}$, the voltage of the complement node C is maintained at logical zero or ground. Then, the first virtual $V_{dd}$ rail 804a is discharged to ground through a first NFET 810a (while header 806a is switched off). However, the second virtual $V_{dd}$ rail 804b remains charged to $V_{dd}$ so as to allow the right side PFETs to maintain a logical 1 state at the true node T and therefore maintain a full $V_{dd}$ input to the gate terminal of the of the left side PFET for intense recovery thereof.

Conversely, in order to implement the intense recovery mode for the right side PFETs (i.e., those PFETs with drain terminals coupled to the true data node T), the cell 802 is first written to a logical "0" (i.e., the complement node, C, is at logic high) such that the gate voltage of the right side PFETs are at $V_{dd}$. Because the gate voltage of the right side NFETs are also at $V_{dd}$, the voltage of the true node T is maintained at logical zero or ground. Then, the second virtual $V_{dd}$ rail 804b is discharged to ground through a second NFET 810b (while header 806b is switched off). However, the first virtual $V_{dd}$ rail 804a remains charged to $V_{dd}$ so as to allow the left side PFETs to maintain a logical 1 state at the complement node C and therefore maintain a full $V_{dd}$ input to the gate terminal of the of the right side PFET for intense recovery thereof.

It will be appreciated that intense recovery of left/right PFETs (for example) in an SRAM array can be carried out on a row-by-row basis, or on a column-by-column basis. Furthermore, while a single pair of PFET headers (806) and pull down NFETs (810) is illustrated for all columns of the array, each column could also have its own set of PFET headers and pull down NFETs for more selective intense recovery control (at a trade off of additional devices used).

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for selectively extending lifetime reliability of digital logic devices, comprising:
    complementary metal oxide semiconductor (CMOS) circuitry configured between a logic high supply rail and a logic low supply rail;
    a first switching device coupled between one of the logic high supply rail and the logic low supply rail and a first virtual supply rail coupled to the CMOS circuitry, and a second switching device coupled between the first virtual supply rail and the other of the logic high supply rail and the logic low supply rail;
    wherein, in a normal mode of operation, the first switching device is rendered conductive and the second switching device is rendered nonconductive so as to supply the full voltage value between the logic high supply rail and the logic low supply rail to the CMOS circuitry, and wherein, in an intense recovery mode of operation, the first switching device is rendered nonconductive so as to isolate the first virtual supply rail from the one of the logic high supply rail and the logic low supply rail, and the second switching device is rendered conductive so as to equalize the voltage on the virtual supply rail and the other of the logic high supply rail and the logic low supply rail; and
    at least one device within the CMOS circuitry configured, in the intense recovery mode of operation, to provide one of the logic high voltage and the logic low voltage to a gate terminal of a first field effect transistor (FET) within the CMOS circuitry, with a source terminal of the first FET coupled to the virtual supply rail, such that the first FET is subjected to a full rail reverse bias condition.

2. The apparatus of claim 1, wherein the first switching device comprises a first PFET header, the first virtual supply rail comprises a first virtual $V_{dd}$ node, the second switching device comprises a pull down NFET device that discharges the first virtual $V_{dd}$ node to the logic low voltage in the intense recovery mode, and the first FET within the CMOS circuitry comprises a PFET having a source terminal coupled to the first virtual $V_{dd}$ node, wherein the gate terminal of the first FET is at the logic high voltage such that the first FET under intense recovery has a full $V_{dd}$ positive gate-to-source voltage applied thereto, and wherein the apparatus further comprises:
    a third switching device coupled between the logic high supply rail and a second virtual $V_{dd}$ node coupled to the CMOS circuitry, and a fourth switching device coupled between the second virtual $V_{dd}$ node and the logic low supply rail; and
    a second FET within the CMOS circuitry, comprising a PFET having a source terminal coupled to the second virtual $V_{dd}$ node; wherein for an intense recovery of the first FET, the second virtual $V_{dd}$ node is maintained at $V_{dd}$ potential while the first virtual $V_{dd}$ node is discharged so as to facilitate a logic high input at the gate terminal of the first FET, and for an intense recovery of the second FET, the first virtual $V_{dd}$ node is maintained at $V_{dd}$ potential while the second virtual $V_{dd}$ node is discharged so as to facilitate a logic high input at the gate terminal of the second FET.

3. The apparatus of claim 2, wherein the CMOS circuitry comprises one or more pairs of cross-coupled inverters such that the first FET comprises a PFET of a first inverter, and the second FET comprises a PFET of the second inverter, with an output of the first inverter coupled to an input of the second inverter and an output of the second inverter coupled to an input of the first inverter.

4. The apparatus of claim 3, wherein the one or more pairs of cross-coupled inverters comprise static random access memory (SRAM) cells initialized to one of a logic low and a logic high state prior to implementing intense recovery for one of the first FET and the second FET.

5. The apparatus of claim 2, further comprising:
    a fifth switching device coupled between the logic low supply rail and a first virtual ground node coupled to the CMOS circuitry, and a sixth switching device coupled between the first virtual ground node and the logic high supply rail;
    a seventh switching device coupled between the logic low supply rail and a second virtual ground node coupled to the CMOS circuitry, and an eighth switching device coupled between the second virtual ground node and the logic high supply rail; and
    a third FET within the CMOS circuitry, comprising an NFET having a source terminal coupled to the first virtual ground node, and a fourth FET within the CMOS circuitry, comprising an NFET having a source terminal coupled to the second virtual ground node;
    wherein for an intense recovery of the third FET, the second virtual ground node is maintained at ground potential while the first virtual ground node is charged so as to facilitate a logic low input at the gate terminal of the third FET, and for an intense recovery of the fourth FET, the first virtual ground node is maintained at ground potential while the second virtual ground node is charged so as to facilitate a logic low input at the gate terminal of the fourth FET.

* * * * *